Nov. 17, 1970     A. D. SCARBROUGH     3,541,432
MAGNETOMETER CAPABLE OF OPERATING WITH A VERY LOW INPUT POWER
Filed Oct. 21, 1968     2 Sheets-Sheet 1
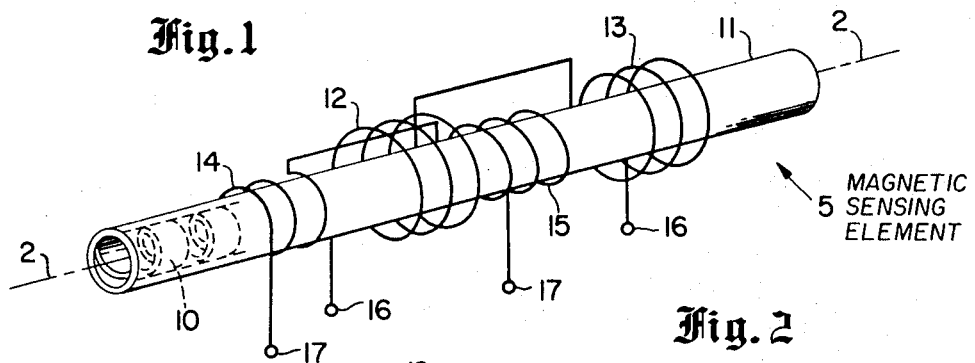
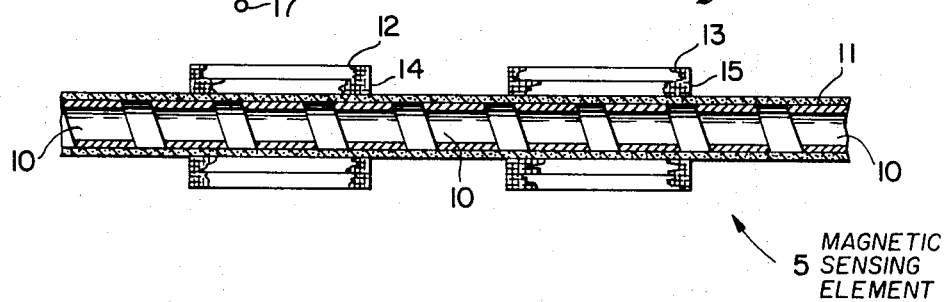
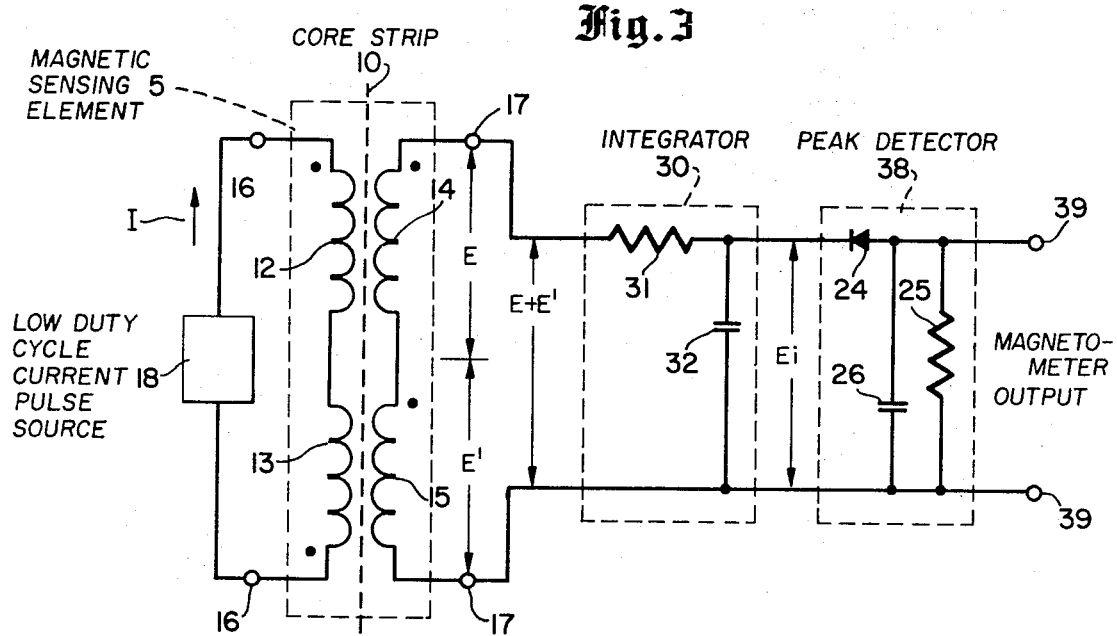
INVENTOR.
ALFRED D. SCARBROUGH
BY Nathan Cass
ATTORNEY

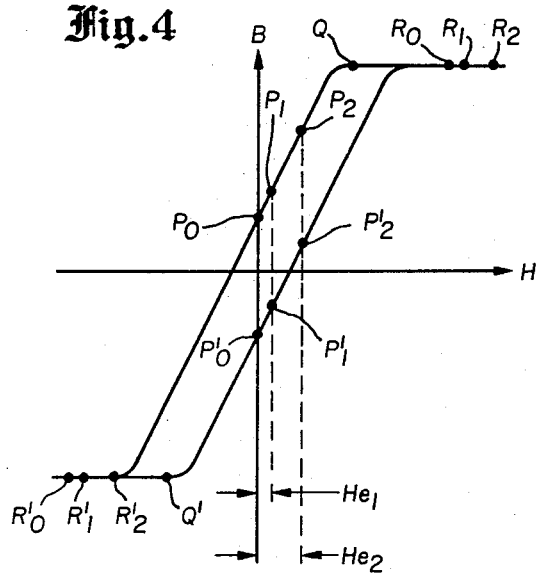
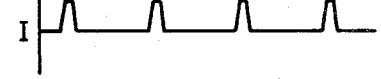
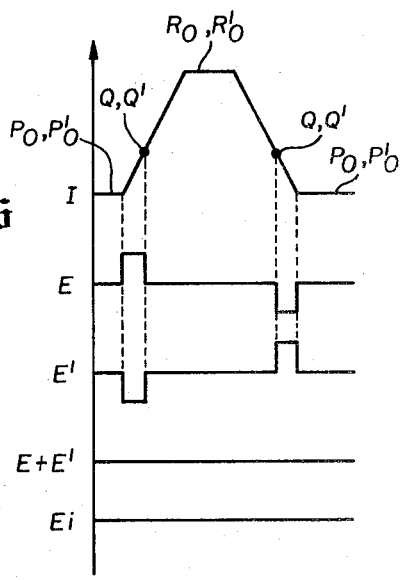
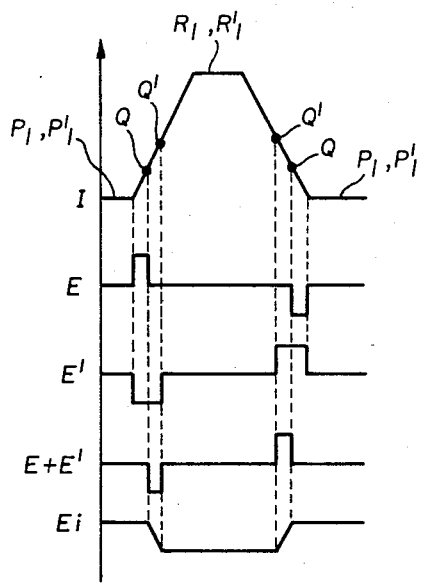
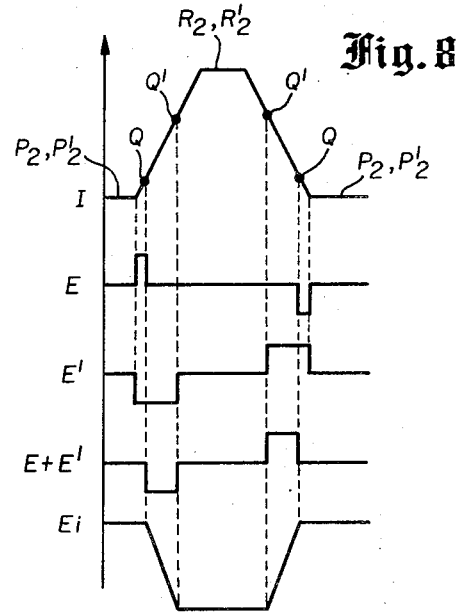

3,541,432
MAGNETOMETER CAPABLE OF OPERATING WITH A VERY LOW INPUT POWER
Alfred D. Scarbrough, Northridge, Calif., assignor to The Bunker-Ramo Corporation, Canoga Park, Calif., a corporation of Delaware
Filed Oct. 21, 1968, Ser. No. 769,252
Int. Cl. G01r 33/02
U.S. Cl. 324—43         2 Claims

ABSTRACT OF THE DISCLOSURE

A flux gate magnetometer providing a measure of an applied external magnetic field and capable of operating with very low input power. The magnetometer includes a magnetic sensing element comprising a magnetically saturable, high permeability core strip cooperating with two oppositely wound input windings and two corresponding like wound output windings. A low duty cycle current pulse source is applied to the input windings of the magnetic sensing element, and an integrator is coupled across the output windings. The integrated signal produced at the output of the integrator in response to each current pulse from the source has a peak amplitude which is proportional to the applied external magnetic field. Since this peak amplitude is independent of the frequency of the current pulse source, the frequency and, thus, the duty cycle and input power required of the source can be very greatly reduced.

BACKGROUND OF THE INVENTION

This invention relates generally to magnetic field sensing devices, and more particularly to improvements in magnetometers of the flux gate type.

A magnetometer is a well known device for measuring magnetic fields, and is typically constructed and arranged to provide an output signal having a predetermined relation with respect to an external magnetic field detected thereby. The magnetometer may be connected to appropriate means for receiving and utilizing the magnetometer output signal. For example, magnetometers have been used in prospecting, in mine detectors, in vehicle detectors, in devices for discovering lost bodies such as sunken ships, and in various other ways.

A magnetometer basically comprises a magnetic sensing element which is sensitive to the strength of an external magnetic field to which the magnetometer is subjected in conjunction with an arrangement for detecting and amplifying indications provided by the element to produce an output signal proportional to the magnetic field being measured. One type of magnetometer, termed a single strip flux gate magnetometer, may utilize a strip of high permeability, magnetically saturable material as the core of the magnetic sensing element, a pair of oppositely wound input windings each associated with a portion of the core strip and connected in series with a sinusoidal alternating current signal source for driving the strip to provide detectable conditions therein responsive to an external magnetic field, and a pair of output windings associated with the strip for detecting the aforementioned fields.

The sinusoidal alternating current signal source applied to the magnetometer input windings provides an excitation field of such magnitude that the segments of the strip which are directly under the input windings are driven to magnetic saturation over a major portion of each half-cycle. The input windings are constructed and arranged such that the excitation field applied to the strip segment under one winding is equal in magnitude and opposite in sense to the excitation field applied to the strip segment under the other input winding. The output windings are closely coupled to their respective input windings and are connected in series winding so as to be individually responsive to the rate of change of the instantaneous flux in their respective strip segments. In the absence of an externally applied field, the net effect at the output windings is zero, and no output signal will result. However, when an external magnetic field of essentially constant magnitude and sense with respect to the period of one excitation cycle is applied to the strip, the strip segment under an input winding will be saturated for a longer period of time during a half-cycle for which the excitation field is in the same sense as that of the external field, and for a shorter period of time during a half-cycle for which the excitation field is in the opposite sense to the external field. Consequently, the presence of an external magnetic field destroys the symmetrical relationship existing between the flux in the respective portions of the strip when no external magnetic field is present. As a result, a complex time-varying signal is produced across the serially connected output windings having a fundamental frequency which is a second harmonic of the frequency of the alternating current signal source, and having an amplitude which is proportional to the magnitude of the external magnetic field within the range of measurement of the magnetometer. Accordingly, by extracting the second harmonic frequency from the output signal, such as by using an appropriate tuned circuit, and by deriving the amplitude thereof, such as by using a peak detector, a resultant D-C output signal can be obtained which is directly proportional to the external magnetic field.

An improved magnetometer of the above-described flux gate type is disclosed in the commonly assigned U.S. Pat. No. 3,319,167, issued on May 9, 1967. In a preferred embodiment, this patent provides a rugged and sensitive low power flux gate magnetometer achieved by using for the strip core a small helical thin strip of a magnetically saturable, high permeability material which is resiliently positioned within the bore of a cylinder of relatively high resistivity, low permeability material, preferably ceramic, so as to bear against the inner surface of the cylinder. The cylinder thereby functions as a strong protective container for the core strip, as well as a base for the input and output windings which may be affixed about its exterior surface and spaced symmetrically along the strip so as to provide a high degree of uniformity. The use of a ceramic cylinder capable of withstanding high temperatures permits a particularly rugged, yet sensitive construction to be provided for the magnetic sensing element, since the use of a ceramic cylinder makes it possible to anneal the cylinder and strip to obtain appropriate magnetic properties after insertion of the strip in the cylinder.

SUMMARY OF THE INVENTION

While the flux gate magnetometer disclosed in the aforementioned patent provides excellent performance, it has the disadvantage of requiring relatively large input power (e.g., 100 milliwatts) from the sinusoidal alternating current source, which can be a severe drawback, particularly where the magnetometer is to be used in a long-life application in which power is derived from batteries. It is accordingly the primary object of the present invention to provide a magnetometer requiring extremely low power.

Another object of the invention is to provide for the attaining of the foregoing object without significantly increasing the size, complexity, or cost, or reducing the ruggedness of the magnetometer.

· A further object is to provide a magnetometer in accordance with the foregoing objects which incorporates the improvements of the aforementioned Pat. No. 3,319,161.

The foregoing objects are accomplished in a preferred embodiment in accordance with the invention which utilizes a flux gate magnetometer having a magnetic sensing element similar to that disclosed in the aforementioned patent in order to take advantage of the improvements provided thereby. However, the remainder of the circuitry of the preferred embodiment of the invention differs in that, instead of using a sinusoidal input source, the preferred embodiment employs a current pulse source which periodically drives the strip core segments into saturation; also instead of providing for a measure of the external magnetic field based on a detection of the amplitude of the second harmonic of the input alternating current signal appearing in the output waveform from the magnetic sensing element, the preferred embodiment provides for a measure of the external magnetic field based on a detection of the peak amplitude of the signal obtained by integrating the output of the magnetic sensing element produced in response to a current pulse applied thereto. The peak amplitude of this integrated output of the magnetic sensing element is not dependent upon the pulse frequency of the current pulse source, thereby making it possible to greatly reduce the frequency and, thus, the duty cycle and input power required of the pulse source. For example, it has been found that a typical magnetometer of the type disclosed in the aforementioned patent used as a sensor in a vehicle detector may typically require an input power of 100 milliwatts, while a magnetometer for the same application in accordance with the present invention may typically require an input power of only 0.1 milliwatt, which is a reduction in power requirements by a factor of 1000.

BRIEF DESCRIPTION OF THE DRAWINGS

The specific nature of the present invention, as well as other objects, advantages and uses thereof, will become apparent from the following detailed description in conjunction with the accompanying drawings, in which like elements are indicated by like reference characters, and in which:

FIG. 1 is a perspective, partially schematic view of a magnetic sensing element incorporating the improvements of the aforementioned patent and which is employed in the preferred embodiment of the present invention described herein;

FIG. 2 is a cross-sectional view of FIG. 1 taken along the line 2—2;

FIG. 3 is a circuit diagram of a preferred embodiment of a flux gate magnetometer in accordance with the invention including the magnetic sensing element of FIGS. 1 and 2;

FIG. 4 is a graph illustrating the hysteresis loop characteristic of a typical strip which may be used in the magnetic sensing element of FIGS. 1 and 2;

FIG. 5 is a graph illustrating an exemplary output waveform of the low duty cycle current pulse source in FIG. 3; and FIGS. 6 to 8 are a series of graphs illustrating the operation of the magnetometer circuit of FIG. 3.

DESCRIPTION OF THE PREFERRED EMBODIMENT

Referring to FIGS. 1 and 2, illustrated therein is a magnetic sensing element 5 incorporating the improvements of the aforementioned Pat. No. 3,319,161, and which is employed in the preferred embodiment of a magnetometer in accordance with the invention to be described herein. It is to be understood that, although it is preferred to employ the magnetic sensing element 5 of FIGS 1 and 2 in the magnetometer of the present invention, the invention is not limited to use of same, but may also advantageously employ other types of magnetic sensing elements.

It will be seen from FIGS. 1 and 2 that the magnetic sensing element 5 basically comprises a core formed of a helical thin strip 10 of a magnetically saturable, high permeability material which is resiliently positioned within the bore of a hollow cylinder 11 of relatively high resistivity and low permeability material so as to bear against the inner surface of the cylinder. The core strip 10 may typically be an alloy No. 4–79 of molybdenum permalloy having cross-sectional dimensions of 0.001 inch by 0.062 inch and having a hysteresis loop characteristic as illustrated in FIG. 5.

As diagrammatically illustrated in FIG. 1, a first input winding 12 and a second oppositely wound and serially connected input winding 13 are wound about the exterior of the cylinder 11 at conveniently spaced positions such that opposed magnetic flux may be induced within different segments of the core strip 10. Since the strip 10 is, in effect, a bar of saturable core material forming an incomplete magnetic path which is completed via the surrounding path, different segments of the core may have flux directed in opposite senses. As also diagrammatically illustrated in FIG. 1, a first output winding 14 and a second like wound and serially connected output winding 15 are additionally wound about the exterior of the cylinder 11 and disposed in relation to the first and second input windings 12 and 13 so as to individually monitor the time rate of change of flux in the respective segments of the strip 10 corresponding thereto. As will be evident from the cross-sectional view of the magnetic sensing element 5 in FIG. 2, the input windings 12 and 13 may be wound upon their respective output windings 14 and 15, which in turn are wound directly on the cylinder 11. The winding terminals 16 and 17 in FIG. 1 indicate that the input and output windings 12, 13, 14, and 15 are adapted to allow for the connection thereto of respective associated input and output circuitry of the magnetometer, as illustrated in FIG. 3.

Before considering FIG. 3 in detail, it is additionally to be noted with respect to FIGS. 1 and 2 that, although not essential, it is preferred to make the cylinder 11 out of a ceramic capable of withstanding the annealing temperature, for example, 2500° F., without loss of physical strength and without emitting deleterious contaminants. By so doing, it becomes possible to anneal the core strip 10 to optimize its magnetic properties after insertion of the strip 10 into the cylinder 11, following which prewound input and output windings 12 to 15 may be inserted on the cylinder, the ends of the cylinder bore then sealed, and the entire magnetic sensing element 5 thereafter cast in a material such as an epoxy resin, whereby a rugged yet highly sensitive construction may be provided for the magnetic sensing element 5.

Referring now to FIG. 3, illustrated therein is a circuit diagram of a flux gate magnetometer in accordance with the invention. As shown, the magnetometer in FIG. 3 includes the magnetic sensing element 5 of FIGS. 1 and 2. Connected across the input terminals 16 of the magnetic sensing element 5 is a low duty cycle current pulse source 18 providing an input current waveform I, as typically illustrated in FIG. 5, the magnitude of each pulse being sufficient to drive the strip into saturation during operation, that is, beyond the point Q in FIG. 4 for the strip segment under input winding 12, and beyond the point Q' for the strip segment under the winding 13. Connected across the output terminals 17 of the magnetic sensing element 5 is an integrator 30 which, as shown in FIG. 3, may typically comprise a resistor 31 and capacitor 32. The output E$i$ of the integrator 30 is in turn applied to a peak detector 38 which, as shown in FIG. 3, may be of conventional form comprising a diode 24 in series with the parallel combination of a capacitor 26 and a resistor 25, the resulting magnetometer output appearing across terminals 39.

For a clear understanding of the operation of the magnetometer circuit of FIG. 3, attention is now additionally directed to FIGS. 4 to 8. FIG. 4 illustrates a typical hysteresis loop characteristic for the strip 10 of the magnetic sensing element 5, and FIG. 5 illustrates a typical current waveform I provided by the low duty cycle current pulse source 18. The graphs of FIGS. 6 to 8 illustrate exemplary operation in response to each pulse of the current waveform I in FIG. 5, a typical pulse being magnified in each of FIGS. 6 to 8 for greater clarity. FIG. 6 illustrates operation when no external magnetic field is present, FIG. 7 illustrates operation when the external magnetic field $He_1$ indicated in FIG. 4 is present, and FIG. 8 illustrates operation when the external magnetic field $He_2$ also indicated in FIG. 4 is present. For the purpose of the description of typical operation to be provided herein, $He_2$ is chosen to have a magnitude three times that of $He_1$. Also, in FIGS. 4 and 6 to 8, unprimed designations are used for signals and characteristics associated with windings 12 and 14, primed designations are used for signals and characteristics associated with windings 13 and 15, and subscripts 0, 1 and 2 are used with the P and R designations to indicate the particular one of the three external magnetic field conditions—zero, $He_1$ and $He_2$—to which each of these designations corresponds.

It is to be noted that the P, Q and R designations in the current pulse I graphs of FIGS. 6 to 8 are provided to indicate the values of the current pulse which correspond to the P, Q and R points on the hysteresis loop of FIG. 4 for each of the external magnetic field conditions illustrated. It is further to be noted with regard to FIGS. 6 to 8 that the voltage signals E and E' respectively produced across the output windings 14 and 15 of the magnetic sensing element 5 in response to each current pulse from source 18 are proportional to the rate of change of the magnetic flux through the respective windings; also, because of the high permeability of the core strip 10, the flux through the windings is, to a close approximation, proportional to the magnetic flux density in the respective core strip segments. Accordingly, the output $E+E'$ from the magnetic sensing element 5 in FIG. 3 may be mathematically expressed as $$E+E'=k(dB/dt+dB'/dt)$$

where $k$ is a constant of proportionality, B and B' are the respective flux densities in the core strip segments of windings 14 and 15. The magnitude of the output voltage $Ei$ from the integrator 30 in FIG. 3 will thus be equal to the integral of $E+E'$ from a time $t=0$ when the input current pulse I has its minimum value to a time $t=T$ when the input current pulse I has its maximum value, the mathematical relationship being expressable by the equation:

$$Ei=\int_0^T (E+E')dt=\int_0^T k(dB/dt +dB'/dt)=k(\Delta B+\Delta B')$$

The magnitude $k(\Delta B+\Delta B')$ of the integrator output $Ei$, as expressed in the above equation, is a direct measure of the external magnetic field, as will become evident from the descriptions to be provided of the operation of the circuit of FIG. 3 for the exemplary conditions illustrated in FIGS. 4 to 8. In this connection, it is to be noted that the graphs of FIGS. 4 to 8 are provided as an aid in visualizing the operation of the magnetometer, and are not to be considered as limiting the invention, since they merely involve operation under particular conditions chosen for illustrative purposes. It is also to be noted that the E and E' graphs in FIGS. 6 to 8 are derivable from the exemplary input current pulse I and the external magnetic field H$e$, since the resulting value of H in FIG. 5 which is applied to each output winding is the sum of the magnetic field produced by I plus any external magnetic field H$e$ which may be present. A value of B can, thus, be obtained for each output winding for any values of I and H$e$, from which E and E' can then be obtained because of their proportionality to $dB/dt$ and hence to $dI/dt$ in the regions $P_0Q$ and $P_0'Q'$ in FIG. 4.

With the above considerations in view, the operation of the circuit of FIG. 3 for the exemplary conditions illustrated in FIGS. 4 to 8 will now be considered.

The operation of the circuit of FIG. 3 for the condition of zero external magnetic field illustrated in FIG. 6 will be considered first. It will be understood from well known hysteresis operation and the previously described arrangement and connection of the input and output windings 12 to 15 that, for zero external magnetic field and for the quiescent condition when no pulse is being supplied by the source 18 in FIG. 3, the segment of the core strip 10 under input winding 12 will reside at point $P_0$ of the hysteresis loop in FIG. 5, while the segment of the core strip 10 under input winding 13 will reside at point $P_0'$ of the hysteresis loop, the flux densities of points $P_0$ and $P_0'$ being equal and opposite. In response to each current pulse from source 18, the core strip segment under the input winding 12 will be driven into positive saturation to point $R_0$ on the hysteresis loop, via point Q at which positive saturation begins, while the core strip segment under the input winding 13 will be driven a like distance in the opposite direction into negative saturation to point $R_0'$ on the hysteresis loop via point Q' at which negative saturation begins. As shown in FIG. 6, the output signals E and E' produced across the respective output windings 14 and 15 in FIG. 3 in response to each current pulse provided by source 18 will thus be equal and opposite for zero external magnetic field, thereby producing a zero output signal $E+E'$ from the magnetic sensing element 5, which in turn produces a zero output signal $Ei$ from the integrator 30, as will also be evident from the previously set out equation for $Ei$ which, for zero external magnetic field, reduces to zero as follows:

$$Ei=k(\Delta B+\Delta B')=k[B(R_0)-B(P_0)\\-B(P_0')+B(R_0')]=0$$

Reference is next directed to FIG. 7, which illustrates the operation of the magnetometer circuit of FIG. 3 when the external magnetic field of $He_1$ is present. It will be understood with reference to FIG. 4 that the presence of $He_1$ will cause the quiescent positions of the core strip segments under respective input windings 12 and 13 to be shifted a like amount in the positive saturation direction to the positions $P_1$ and $P_1'$, respectively, thereby upsetting the symmetrical condition existing for zero magnetic field. As a result, each pulse from source 18 will cause the core strip segments under the input windings 12 and 13 to reach their respective saturation points Q and Q' in FIG. 4 at different values of the current pulse, as shown in the current pulse graph I in FIG. 7, and will cause the strip core segments to be driven into saturation by different amounts, as indicated by the location of the points $R_1$ and $R_1'$ in FIG. 4. The output signals E and E' of respective output windings 14 and 15 in FIG. 3 will, thus, no longer be equal and opposite but, as shown in FIG. 7, the width of the E signal pulse will be narrower than for the zero external magnetic field condition illustrated in FIG. 6, while the E' pulse will be wider by a like amount, thereby producing the $E+E'$ signal illustrated in FIG. 7 which, when integrated by the integrator 30 in FIG. 3, produces the signal $Ei$ in FIG. 7. From the previously set out equation, the value of $Ei$ is $$Ei=k(\Delta B+\Delta B')=k[B(R_1)-B(P_1)\\-B(P_1')+B(R_1')]\approx -2k[B(P_1)-B(P_0)]$$

which will be understood to be a direct measure of the external magnetic field $He_1$.

Now, considering FIG. 8, which illustrates the operation of the magnetometer circuit of FIG. 3 when the external magnetic field $He_2$ is present, it will be remembered that the magnitude of $He_2$ is assumed to be three times that of $He_1$. Consequently, the external magnetic field $He_2$ will cause the quiescent positions of the core strip segments under the input windings 12 and 13 in FIG. 3 to be shifted in the positive saturation direction to respective points $P_2$ and $P_2'$ in FIG. 4, which is a shift three times greater than that occurring in response to $He_1$. Also, the maximum saturations to which the core strip segments are driven by the current pulse will similarly shift to points $R_2$ and $R_2'$ in FIG. 4. It will thus be understood that $He_2$ will cause the signals E and E' to be respectively narrower and wider with respect to their zero external magnetic field values by an amount which will produce a signal $E+E'$ three times wider than for $He_1$, and which upon integration will produce a signal $Ei$ having a negative peak amplitude three times that produced for $He_1$. From the previously set out equation, the value of $Ei$ is $$Ei=k[B(R_2)-B(P_2)-B(P_2') +B(R_2')]\approx -2k[B(P_2)-B(P_0)]$$

which will be understood to be a direct measure of the external magnetic field $He_2$.

From the examples of typical operation illustrated in FIGS. 4 and 6 to 8 for the magnetometer circuit of FIG. 3, it will be evident that the integrated signal $Ei$ produced in response to each input current pulse I from source 18 will have a magnitude directly proportional to the magnitude of the external magnetic field and will have a sign indicative of the direction of the magnetic field. It is important to note that this proportional relationship is obtained in response to each current pulse from current source 18, regardless of the pulse frequency. Therefore, the present invention makes possible a very great reduction in the pulse frequency and, thus, the duty cycle and required input power of the current source 18. A further advantage of the approach of the present invention is that operation is largely independent of the shape of the input current pulses provided by source 18, so that simply constructed pulse sources may be employed.

It is to be noted from a practical viewpoint that the extent to which the frequency of the current pulse source is reduced may be dictated by the desirability of providing reasonable values for the components of the peak detector 38 in FIG. 3, the signal $Ei$ being applied to the peak detector 38 in order to provide a magnetometer D-C output signal across output terminals 39 which is directly proportional to the external magnetic field. Even when the frequency of the source 18 is limited for this reason, a sufficiently low duty cycle may still be provided for the source 18 so as to provide a magnetometer in accordance with the invention which, in an exemplary application, such as when used as a sensor in a vehicle detector, typically requires an input power of only 0.1 milliwatt, as compared to the 100 milliwatts typically required of a magnetometer of the type disclosed in the aforementioned patent.

It is to be understood that the present invention is not limited to the specific embodiments described herein, since many modifications and variations in construction, arrangement and usage may be made without departing from the spirit of the invention. The present invention is, therefore, to be considered as including all possible modifications and variations coming within the scope of the invention as defined in the appended claims.

The embodiments of the invention in which an exclusive property or privilege is claimed are defined as follows:

1. A magnetometer for obtaining a measure of an external magnetic field comprising:
  a saturable, high permeability magnetic core to which the external magnetic field to be measured is applied,
  a pair of oppositely wound series input windings inductively coupled to respective spaced portions of said core,
  a low duty cycle current pulse source coupled to said input windings for repetitively driving the respective portions of said core into opposite senses of saturation,
  a pair of like wound output windings inductively coupled to said core so as to be responsive to flux variations in the respective portions thereof,
  an electronic integrating means coupled to said output windings for integrating the signal produced across said output windings in response to each pulse from said pulse source, each resulting pulse at the output of said integrating means having an amplitude proportional to the external magnetic field, and
  an electronic peak detector for receiving the output from said integrating means and for detecting the amplitude of the resulting pulses therefrom so as to provide a D-C output signal proportional to the external magnetic field.

2. A magnetometer for obtaining a measure of an external magnetic field comprising:
  a high resistivity hollow cylinder having a bore along the length thereof,
  a thin, high permeability helical strip of magnetically saturable material having a high permeability relative to the permeability of the material of said cylinder coaxially positioned within said bore and resiliently bearing against the inner surface of said cylinder,
  a first winding provided about the exterior of said cylinder at a first position thereof;
  a second winding provided about the exterior of said cylinder at a second position thereof,
  a low duty cycle current pulse source,
  means coupling said source to said first and second windings so as to cause respective segments of said strip to be repetitively saturated in opposite senses in response in response to each current pulse,
  a third winding provided about the exterior of said cylinder so as to be responsive to flux changes in one of said strip segments,
  a fourth winding provided about the exterior of said cylinder so as to be responsive to flux changes in the other of said strip segments,
  an electronic integrating means coupled to said third and fourth windings, said integrating means being operative to integrate the signal produced across said third and fourth windings in response to each pulse from said pulse source so that each pulse appearing at the output of said integrating means has a peak amplitude proportional to the magnitude of the external magnetic field applied to said strip, and
  an electronic peak detector responsive to the amplitude of the pulses at the output of said integrating means for providing a D-C output signal proportional to the external magnetic field.

References Cited

UNITED STATES PATENTS

| 2,935,682 | 5/1960 | Gates. | |
|---|---|---|---|
| 3,319,161 | 5/1967 | Beynon | 324—47 |

FOREIGN PATENTS

| 1,080,217 | 4/1960 | Germany. |
|---|---|---|

OTHER REFERENCES

McNish, A.G.: An Induction-Magnetometer: Principle of Operation; Transactions, American Geophysical Union; vol. 27, No. 1; February 1946, pp. 49–51.

RUDOLPH V. ROLINEC, Primary Examiner

R. J. CORCORAN, Assistant Examiner